United States Patent

Bruzzese et al.

[11] 3,901,912
[45] Aug. 26, 1975

[54] 3,3-BIS-(P-PHOSPHONOXY- AND P-SULPHOXY-PHENYL)-2-INDOLINONES

[75] Inventors: Tiberio Bruzzese; Giuseppe Ghielmetti; Rodolfo Ferrari, all of Milan, Italy

[73] Assignee: SPA-Societa Prodotti Antibiotici S.p.A., Milan, Italy

[22] Filed: May 16, 1973

[21] Appl. No.: 360,942

Related U.S. Application Data

[62] Division of Ser. No. 153,434, June 15, 1971, abandoned.

[30] Foreign Application Priority Data

June 16, 1970 United Kingdom............... 29047/70

[52] U.S. Cl. ... 260/325 R; 260/297 P; 260/294.8 R; 424/263; 424/274
[51] Int. Cl............................................. C07d 27/40
[58] Field of Search ................................. 260/325 R

[56] References Cited
UNITED STATES PATENTS
1,940,660  12/1933  Christiansen et al. .............. 260/325

*Primary Examiner*—Joseph A. Narcavage
*Attorney, Agent, or Firm*—Wenderoth, Lind & Ponack

[57] ABSTRACT

There are provided new esters of diphenolic substances with polybasic inorganic acids, these esters having the general formula:

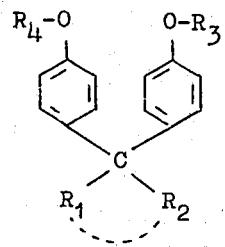

wherein $R_1$ is a hydrogen atom or a lower alkyl radical, $R_2$ is a lower alkyl radical or a heterocyclic radical or $R_1$ and $R_2$, together with the carbon atom to which they are attached, form a saturated or unsaturated carbocyclic or heterocyclic radical, $R_3$ is the residue of a polybasic inorganic acid and $R_4$ is a hydrogen atom, an acyl radical or the residue of a polybasic inorganic acid, with the proviso that $R_4$ is not a sulpho radical when $R_3$ is a sulpho radical and

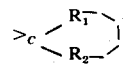

represents an isopropylidene, 2-picolylidene or 3-phthalidylidene radical; and the non-toxic salts thereof.

5 Claims, No Drawings

3,3-BIS-(P-PHOSPHONOXY- AND P-SULPHOXY-PHENYL)-2-INDOLINONES

BACKGROUND OF THE INVENTION

This is a division of Ser. No. 153,434, filed June 15, 1971, now abandoned.

The need for efficient cathartic compounds is well known but many of the cathartic compositions at present available suffer from numerous disadvantages, such as producing an irritating effect, especially in the colonic and rectal regions of the intestinal tract, and of having a comparatively low solubility, which renders administration more difficult and frequently necessitates particular forms of formulation of the known cathartic compounds. Furthermore, many of the known cathartic compounds have an insufficient stability at the pH values prevailing in the gastro-intestinal tract, which reduces their efficacity.

Consequently, there is a need for a new group of cathartic compounds which do not suffer from the disadvantages of the previously known and used cathartic compounds and, accordingly, it is an object of the present invention to provide such a group of new cathartic compounds.

SUMMARY OF THE INVENTION

According to the present invention, there are provided new esters of the general formula:

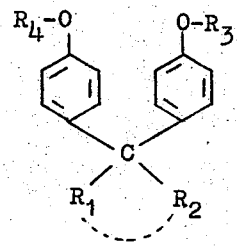

(I)

wherein $R_1$ is a hydrogen atom or a lower alkyl radical, $R_2$ is a lower alkyl radical or a heterocyclic radical or $R_1$ and $R_2$, together with the carbon atom to which they are attached, form a saturated or unsaturated carbocyclic or heterocyclic radical, $R_3$ is the residue of a polybasic inorganic acid and $R_4$ is a hydrogen atom, an acyl radical or the residue of a polybasic inorganic acid with the proviso that $R_4$ is not a sulpho radical when $R_3$ is a sulpho radical and

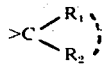

represents an isopropylidene, 2-picolylidene or 3-phthalidylidene radical; and the non-toxic salts thereof.

DETAILED DESCRIPTION OF THE INVENTION

When $R_1$ and/or $R_2$ are lower alkyl radicals, these are straight or branched chained and preferably contain up to 6 carbon atoms, such as methyl, ethyl, propyl, isopropyl, n-butyl, n-pentyl and n-hexyl radicals.

When $R_2$ is a heterocyclic radical, this is preferably a pyridyl-containing radical, such as a 2-pyridyl or 2-quinolyl radical.

When $R_1$ and $R_2$ are joined to form a cyclic radical, this is preferably a 3-(2-oxo)-indolinylidenyl or phthalidylidenyl radical.

The residues of polybasic inorganic acids $R_3$ and $R_4$ are preferably derived from sulphuric acid, sulphurous acid or phosphoric acid.

Finally, when $R_4$ is an acyl radical, this can be derived from an aliphatic or aromatic carboxylic acid, such as formic acid, acetic acid, propionic acid, benzoic acid or the like.

The salts of the new compounds (I) can be those derived from non-toxic, pharmaceutically acceptable inorganic and organic bases, such as the alkali metal salts, preferably the sodium and potassium salts, the alkaline earth metal salts, such as the calcium salts, the ammonium and quaternary ammonium salts, and the salts with organic bases, such as methylamine, dimethylamine, ethylamine, morpholine, piperidine and the like.

The compounds 4,4'-dihydroxydiphenyl-(2-pyridyl)-methane, 4,4'-dihydroxydiphenyldimethylmethane, oxyphenisatin and phenolphthalein have previously been used as laxatives. However, they suffer from the serious disadvantage of being irritating, giving rise to gastrointestinal intolerance which is, perhaps, mainly due to the presence of free phenolic groupings. The esterification or etherification of these phenolic hydroxyl groups with organic acids or alcohols, in an attempt to overcome the irritating effects, often resulted in compounds of very low laxative potency.

The new compounds (I) according to the present invention have various advantages as compared with the known organic acid esters, for example the diacetyl esters. Thus, they are water-soluble and can, therefore, be administered in various aqueous pharmaceutical forms. They are also stable at neutral and alkaline pH values. In addition, the new compounds (I) are much less irritating than the corresponding 4,4'-dihydroxy compounds but are generally as effective as the dihydroxy compounds.

The potency of the cathartic action was studied in rats by the usual methods and by orally administering 10 mg./kg. of active substance. We found that all compounds tested are highly active, thus confirming that the acidic phenolic hydroxyl group may be replaced in the vicinal position by the hydroxyl group of an acid while maintaining or strengthening the cathartic activity. Among the new derivatives (I) studied, those of 4,-4'-dihydroxydiphenyl-(2-pyridyl)-methane are the most active, especially 4,4'-diphosphonoxydiphenyl-(2-pyridyl)-methane, 4-hydroxy-4'-sulphoxydiphenyl-(2-pyridyl)-methane and the corresponding 4-acetoxy derivative.

The novel compositions of the present invention contain at least one active compound (I), together with a pharmaceutically-acceptable carrier. The term "pharmaceutically-acceptable carrier" as used herein in reference to the compositions of the present invention means a solid or liquid composed of a single substance or a number of substances which may be solids, liquids or a combination of solids and liquids. The concentration of active ingredient in the composition is not critical but, for economy of preparation, should be at least 0.3% by weight and is preferably 0.5–2.0% by weight. These compositions can be administered either orally, rectally or parenterally to human subjects and are generally administered in an amount sufficient to give 25 to 250 mg. of active substance per day. For oral administration, there can be used any conventional type of tablets, lozenges, capsules, dragees, pills and powders; for parenteral administration, aqueous and non-aqueous solutions or suspensions are appropriate and for rectal administration there can be used any conventional type of suppository base, such as glycerol, cocoa butter and the like. The new compounds can also be used in solutions which are appropriate for rectal instillation. Acceptable pharmaceutical carriers include gelatine capsules, sugars, such as lactose or sucrose, starches, such as corn starch or potato starch, cellulose derivatives, such as sodium carboxymethyl cellulose, ethyl cellulose, methyl cellulose or cellulose acetate phthalate, gelatin, talc, calcium phosphates, such as dicalcium phosphate or tricalcium phosphate, sodium sulphate, calcium sulphate, polyvinyl pyrrolidone, acacia, polyvinyl alcohol, stearic acid, alkaline earth metal stearates, such as magnesium stearate, vegetable oils, such as groundnut oil, cottonseed oil, sesame oil, olive oil, corn oil and oil of theobroma, water, agar, alginic acid, benzyl alcohol, isotonic saline and phosphate buffer solutions, as well as other non-toxic, compatible substances used in pharmaceutical formulations.

The new compounds according to the present invention can be prepared by esterifying dihydroxy compounds of the general formula:

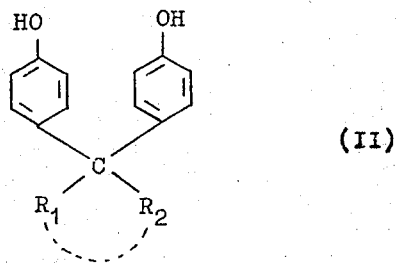

(II)

in which $R_1$ and $R_2$ have the same meanings as above, with one or two equivalents of a polybasic inorganic acid. When only one equivalent of a polybasic inorganic acid is used, then the product obtained still contains one free hydroxyl group. If desired, this can then be acylated with an organic carboxylic acid.

For carrying out the esterification with inorganic and organic acids, a reactive derivative thereof is usually employed, such as a halide or anhydride. Thus, for example, in order to prepare the phosphoric acid esters, the compounds (I) can be reacted with phosphorus oxychloride in the presence of an acid-binding agent, preferably pyridine, which results in the replacement of one or two hydroxyl groups by $-O-POCl_2$ groups which can then be reacted with an aqueous alkali to give the corresponding $-O-PO(OH)_2-$ group containing compounds in the form of salts.

The alkaline solution is washed with organic solvents, such as chloroform or benzene, to remove the reaction solvent or, when pyridine has been used, it can be distilled off at reduced pressure as an azeotropic mixture with water, decolourised with charcoal and, if desired, treated with hydrochloric acid in order to give the phosphoric ester. This acid compound can be converted into the corresponding sodium salt by reaction with a stoichiometric quantity of sodium hydroxide in aqueous solution; the salt can then be isolated by treatment with solvents, such as acetone or alcohol, or by direct concentration to dryness at reduced pressure and subsequent washing with organic solvents. The products thus obtained can be further purified in order to remove any impurities; the latter can be due to further intra- or inter-molecular reaction of the initially present $-O-POCl_2$ group with other phenolic hydroxy groups, thus giving phosphoric triesters, such as

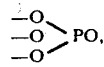

or diesters, such as

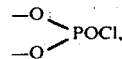

the latter being hydrolysed to

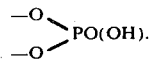

Different methods of purification can be used, such as treatment of the sodium salt with 90% aqueous methanol or fractional precipitation with hydrochloric acid to give the desired ester in acid form. Purification can also be carried out by column chromatography on silica gel, using diluted hydrochloric acid as eluent.

The new compounds can also be prepared by using, for example, compounds of the general formula POCl R'R', in which R' can be a substituted or unsubstituted phenoxy or benzyloxy radical or an aniline or morpholino group or, generally, any substituent which can be easily removed by hydrolysis after esterification with the diphenolic compound, preferably in an alkaline medium in which the ester bond is most stable. This method prevents the formation of phosphoric acid polyesters.

The esterification can also be carried out with the use of polyphosphoric or metaphosphoric acid.

In the preparation of 4,4'-diphosphonoxydiphenyl-(2-pyridyl)-methane, there can be used either 4,4'-dihydroxydiphenyl-(2-pyridyl)-methane or the di- or tetra-substituted derivatives in which the ortho positions to the hydroxyl group are substituted by halogen atoms: the latter compounds are already known from the literature and can be readily obtained from 2-pyridylaldehyde and di- or tetra-substituted phenols because the presence of halogen in the ortho position limits or prevents the formation of positional isomers during the condensation. The halogen derivatives of 4,4'-dihydroxydiphenyl-(2-pyridyl)-methane, after esterification with phosphorus oxychloride, can easily be dehalogenated by treatment with an alloy of equal amounts of nickel and aluminium in an alkaline solution.

The sulphuric esters can usually be prepared in an anhydrous medium using pyridine as solvent and chlorosulphonic acid as the esterification reagent; in some cases, it is advantageous to use sulphur trioxide in the form of addition compounds with organic amines, such as pyridine or triethylamine, in a molar ratio of 1:1. At the end of the reaction, the mixture is treated with an aqueous alkaline solution, such as sodium hydroxide, to give a pH of 8, the pyridine being removed by washing with solvents or by azeotropic distillation. The alkaline solution is dried under reduced pressure without isolating the acid form of the ester and the solid residue is extracted with ethanol, while heating, to give the salts of the desired compound.

As for the monoesters ($R_4 = H$), they are easily prepared by using equimolar amounts of esterification reagent and of diphenolic compound (II). In the case of phosphoric acid monoesters, it is essential to use the above-mentioned POCl R'R' reagents but there is no particular difficulty in the preparation of the sulphuric monoesters.

The monoesters thus obtained can then, if desired, be further esterified on the second phenolic hydroxyl group with polybasic inorganic acids, using the procedures already described above, or with organic acids using the standard methods known from the literature. It is also possible first to prepare the monoesters with organic acids ($R_4 = $ acyl) and then to esterify the products with a polybasic inorganic acid.

The new compounds (I) according to the present invention are colourless, crystalline solids with high melting points (decomposition or carbonisation). They crystallise in a hydrated form and it is difficult to obtain the anhydrous form, even in a vacuum. All the compounds are soluble in water, sparingly soluble in alcohols and practically insoluble in the usual organic solvents, such as benzene and chloroform.

The following Examples are given for the purpose of illustrating the present invention:

EXAMPLE 1

100 ml. (1.09 moles) phosphorus oxychloride are slowly added to 680 ml. anhydrous pyridine cooled to −20°C. and the mixture thus obtained is stirred at the same temperature for 15 minutes. A solution of 75 g. (0.27 mole) 4,4'-dihydroxydiphenyl-(2-pyridyl)-methane in 440 ml. anhydrous pyridine is added to the above mixture within the course of about 20 minutes, while stirring. During the addition, the mixture is kept at −20°C. by external cooling and then it is kept at the same temperature for a further 15 minutes. The mixture is thereafter slowly poured, while stirring, into a solution of 225 g. sodium hydroxide in 1000 g. water-ice mixture. Heat develops and the temperature rises to about 50°C. After some minutes, the mixture is cooled, the pH is adjusted to about 9 by addition of 1:1 hydrochloric acid:water and the pyridine layer is removed by extraction with chloroform, using two litres of chloroform divided into two portions. The aqueous solution thus obtained is decolourised with charcoal and concentrated hydrochloric acid is added dropwise, while stirring, until the pH is 0.7. A copious precipitate is obtained as the solubility of the product is decreased by the presence of inorganic ions in the solution.

The precipitated solid is isolated by filtration, washed with a little ice water and dried under reduced pressure to give 4,4'-diphosphonoxydiphenyl-(2-pyridyl)-methane in the form of a colourless, slightly hygroscopic solid; yield 80–90% of theory.

This substance can be transformed into a salt, for example the sodium salt, by suspending it in 4 parts of water and adding a 10% solution of sodium hydroxide until the pH is about 8.8. The solution thus obtained is decolourised with charcoal and concentrated to dryness under vacuum and at the temperature of about 50°C. to give a pasty residue which is treated with acetone to give a colourless and crystalline solid, which is 4,4'-diphosphonoxydiphenyl-(2-pyridyl)-methane tetrasodium salt. The compound does not melt up to 250°C. and at this temperature it gradually starts to carbonise.

The product can be purified by treatment with 15 parts of 90% aqueous methanol, filtered and the solution obtained heated to the boil to give a copious precipitate because the substance is more soluble when cold than when hot. Finally, the suspension obtained is filtered while boiling and the solid dried to give the pure substance.

Analysis (anhydrous substance) $C_{18}H_{13}NO_8P_2Na_4$: Calc.: C,41.16% H,2.49%; N,2.67%; P,11.80%. Found: C,40.85%; H,2.53%; N,2.60% P,11.72%.

EXAMPLE 2

A solution of 4,4'-dihydroxydiphenyl-(2-pyridyl)-methane in anhydrous pyridine is treated with phosphorus oxychloride in the manner described in Example 1 and the reaction mixture then worked up in the same manner to give 4,4'-diphosphonoxydiphenyl-(2-pyridyl)-methane. 50 g. of this product are mixed with a diluted solution of sodium hydroxide until the pH is about 5, then the solution obtained is diluted to 1 litre with water and 1:1 hydrochloric acid : water added until the pH is 0.7. Precipitated material is discarded because it may contain byproducts of the reaction. The remaining solution is adjusted to pH 9 with 10% sodium hydroxide solution and concentrated to a small volume by distillation under reduced pressure.

Subsequent addition to the concentrated solution of hydrochloric acid until the pH is 0.7 gives an analytically pure precipitate of the desired product. The solid is filtered off, washed with a little cold water in order to remove any traces of inorganic salts and then again dissolved with dilute sodium hydroxide solution at a pH of 8.8. The solution is decolourised with charcoal and evaporated to dryness at reduced pressure and temperature. The evaporation residue is washed with acetone and a little anhydrous methanol to give a good yield of the pure tetrasodium salt of 4,4'-diphosphonoxydiphenyl-(2-pyridyl)-methane.

EXAMPLE 3

4,4'-diphosphonoxydiphenyl-(2-pyridyl)-methane is prepared in the manner described in Example 1. 10 g. of the compound are dissolved in 5% sodium hydroxide solution at a pH of 4–5 and the solution then subjected to chromatography on a column of 100 g. silica gel suspended in water, using 0.02 N hydrochloric acid as eluent.

The first acid fractions of eluate are discarded, while the following ones, containing the purified substance at pH 4, are collected. The product is recovered from this solution, in the acid form or as a salt, following the procedure described in Example 1.

EXAMPLE 4

80 ml. (0.87 mole) phosphorus oxychloride are slowly added to 550 ml. anhydrous pyridine cooled to −20°C. and the mixture thus obtained is stirred at the same temperature for 15 minutes. While continuing stirring, 76 g. (0.22 mole) 3,3'-dichloro-4,4'-dihydroxydiphenyl-(2-pyridyl)-methane, dissolved in 400 ml. of anhydrous pyridine, are added within the course of about 15 minutes, with external cooling. The reaction mixture is kept at −20°C. for 30 minutes and then poured, while stirring, into a solution of 220 g. sodium hydroxide in 1200 g. water-ice mixture. The reaction is exothermic. The reaction mixture is allowed to cool at ambient temperature for 1 hour and then the pyridine layer is recovered by washing with chloroform.

The alkaline solution containing the sodium salt of 3,3′-dichloro-4,4′-diphosphonoxydiphenyl-(2-pyridyl)-methane is treated with 40 g. of a powdered alloy of nickel-aluminium (1:1) in order to dehalogenate the compound, the alloy being added portionwise within the course of about 8 hours at ambient temperature and while stirring.

The mixture is further stirred overnight and then solid in suspension is removed by filtration and the solution is decolourised with charcoal. 4,4′-diphosphonoxydiphenyl-(2-pyridyl)-methane is isolated from the alkaline solution thus obtained, using one of the procedures described in Example 1.

EXAMPLE 5

14.7 ml. (0.16 mole) phosphorus oxychloride are slowly added to 100 ml. anhydrous pyridine cooled to −20°C. and the mixture is then further stirred for 15 minutes.

A solution of 12.7 g. (0.04 mole) 3,3-bis-(p-hydroxyphenyl)-2-indolinone in 60 ml. anhydrous pyridine is added dropwise at the same temperature, while stirring. The reaction mixture is kept at −20°C. for a further 30 minutes and then slowly poured into a solution of 33 g. sodium hydroxide in 200 g. of a water-ice mixture. The reaction mixture is then worked up as in Example 1 to give a good yield of the tetrasodium salt of 3,3-bis-(p-phosphonoxyphenyl)-2-indolinone. The compound is a colourless, crystalline solid; m.p. 233°–235°C. (decomp.).

Analysis (anhydrous substance) $C_{20}H_{13}NO_9P_2Na_4$: Calc.: C,42.29%; H,2.32%; N,2.48%; P,10.96%. Found: C,42.63%; H,2.36%; H,2.50%; P,10.78%.

EXAMPLE 6

22.2 g. (0.07 mole) 3,3-bis-(p-hydroxyphenyl)-2-indolinone are dissolved in 160 ml. anhydrous pyridine and externally cooled to give a temperature of 0°–5°C. 20 g. (0.17 mole) Chlorosulphonic acid are then added dropwise within the course of 30 minutes. Towards the end of the addition, a precipitate is formed which then gradually dissolves. The reaction mixture is left to stand overnight at ambient temperature and then slowly poured into a solution of 20 g. sodium hydroxide in 400 g. water-ice mixture. The alkaline solution obtained is repeatedly washed with chloroform and then the pH is adjusted to 7.5 by the addition of concentrated hydrochloric acid; this solution is finally washed again with chloroform, decolourised with charcoal and evaporated under reduced pressure and at a reduced temperature. The solid residue is repeatedly extracted with 300 ml. portions of boiling ethanol, the insoluble fraction being discarded. The ethanolic extracts are decolourised with charcoal and concentrated under reduced pressure until crystallisation commences. A high yield of 3,3-bis-(p-sulphoxyphenyl)-2-indolinone disodium salt is obtained in the form of a colourless solid.

Analysis (anhydrous substance) $C_{20}H_{13}NO_9S_2Na_2$: Calc.: C,40.67%; H,2.51%; N,2.69%; S,12.30%. Found: C,40.35%; H,2.58%; N,2.65%; S,12.18%.

EXAMPLE 7

A solution of 55.4 g. (0.2 mole) 4,4′-dihydroxydiphenyl-(2-pyridyl)-methane in 360 ml. anhydrous pyridine is externally cooled to 0°C. and then 23.3 g. (0.2 mole) chlorosulphuric acid are added dropwise within the course of 1 hour, while stirring and keeping the temperature below 0°C. The reaction mixture is left to stand overnight at ambient temperature and then carefully poured into a solution of 20 g. sodium hydroxide in 800 g. water-ice mixture. The alkaline solution thus obtained is repeatedly washed with chloroform and the pH adjusted to 7.5 with concentrated hydrochloric acid, a slight precipitate of unreacted substance possibly being formed. After filtration and decolourisation with charcoal, the solution is evaporated to dryness at reduced temperature and pressure. The residue is extracted with 600 ml. of boiling ethanol divided into 2 portions and the insoluble fraction, consisting of inorganic salts, is discarded. The combined alcoholic extracts are decolourised with charcoal, concentrated to a small volume under reduced pressure and left to crystallise or treated with diethyl ether in order to precipitate, in high yield, the monosodium salt of 4-hydroxy-4′-sulphoxydiphenyl-(2-pyridyl)-methane. The compound is a colourless, crystalline solid; m.p. 197°–199°C. (decomp.).

Analysis (anhydrous substance) $C_{18}H_{14}NO_5SNa$: Calc.: C,56.99%; H,3.72%; N,3.69%; S,8.45%. Found: C,56.53%; H,3.78%; N,3.61%; S,8.50%.

EXAMPLE 8

11.6 g. (0.1 mole) chlorosulphonic acid are added, in the course of 1 hour, to a solution of 34.6 g. (0.1 mole) 3,3′-dichloro-4,4′-dihydroxydiphenyl-(2-pyridyl)-methane in 200 ml. anhydrous pyridine at a temperature below 0°C. and with efficient stirring. The reaction mixture is left to stand overnight at ambient temperature and then poured into a mixture of 400 g. water-ice containing 35 g. sodium hydroxide and repeatedly washed with chloroform. The alkaline solution, which contains the sodium salt of 3,3′-dichloro-4-hydroxy-4′-sulphoxydiphenyl-(2-pyridyl)-methane, is treated portionwise with 18 g. of a powdered alloy of nickel-aluminium (1:1) in the course of about 8 hours and with vigorous stirring.

The reaction mixture is stirred overnight, separated by filtration from the solid in suspension and the pH is then adjusted to 7.5 by adding concentrated hydrochloric acid. The slight precipitate which forms is filtered off and the solution is decolourised with charcoal and evaporated to dryness at reduced pressure and temperature. The reaction mixture is worked up as in Example 7 to give a high yield of the sodium salt of 4-hydroxy-4′-sulphoxydiphenyl-(2-pyridyl)-methane.

EXAMPLE 9

8 g. (0.1 mole) sulphur trioxide are collected in 60 ml. anhydrous pyridine, with moderate cooling, to give a precipitate consisting of the 1:1 addition compound. The solid is collected by filtration, washed with ether and possibly dried under vacuum and then added portionwise to a stirred solution, at ambient temperature, of 27.7 g. (0.1 mole) 4,4′-dihydroxydiphenyl-(2- pyridyl)-methane in 100 ml. anhydrous pyridine. The reaction mixture is stirred for another 5 hours at ambient temperature and then the solution obtained is concentrated by partially distilling off the pyridine at reduced pressure and temperature. The residue is added to a diluted cold solution of excess sodium hydroxide, the pH is adjusted to 7.5 with sulphuric acid and then any trace of precipitate is filtered off and the solution is decolourised with charcoal, evaporated to dryness and worked up as described in Example 7 to give the sodium salt of 4-hydroxy-4'-sulphoxydiphenyl-(2-pyridyl)-methane.

EXAMPLE 10

10 g. of sodium salt of 4-hydroxy-4'-sulphoxydiphenyl-(2-pyridyl)-methane are heated with 10 g. anhydrous sodium acetate and 50 ml. acetic anhydride on a boiling water bath. The cooled reaction mixture is filtered and the solution obtained is treated with diethyl ether to give a colourless, crystalline precipitate of the sodium salt of 4-acetoxy-4'-sulphoxydiphenyl-(2-pyridyl)-methane. The compound is collected by filtration and purified with a mixture of ethanol and ether; m.p. 142°–143°C.

Analysis (anhydrous substance) $C_{20}H_{16}NO_6SNa$: Calc.: C,57.00%; H,3.83%; N,3.32%; S,7.61%. Found: C,57.34%; H,3.80%; N,3.32%; S,7.55%.

The same product is obtained by the reaction of 4-acetoxy-4'-hydroxydiphenyl-(2-pyridyl)-methane with chlorosulphonic acid in anhydrous pyridine, following essentially the same procedure described in Example 7, taking care to use low temperatures in the concentration phase of the solutions in order to prevent hydrolysis of the acetyl radical.

The following Examples illustrate pharmaceutical compositions according to the present invention:

EXAMPLE 11

250 mg. tablets are prepared containing:

| | |
|---|---|
| 4,4'-diphosphonoxydiphenyl-(2-pyridyl)-methane tetrasodium salt | 25 mg. |
| starch | 150 mg. |
| lactose | 70 mg. |
| magnesium stearate | 5 mg. |

EXAMPLE 12

250 mg. tablets are prepared containing:

| | |
|---|---|
| 3,3-bis-(p-sulphoxyphenyl)-2-indoline disodium salt | 50 mg. |
| starch | 140 mg. |
| lactose | 55 mg. |
| magnesium stearate | 5 mg. |

The compositions described in Examples 11 and 12 are intended for oral administration to humans for the relief of constipation.

We claim:

1. An ester of the formula

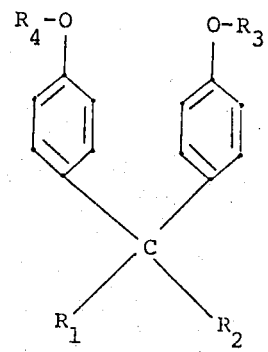

wherein $R_1$ and $R_2$, together with the carbon atom to which they are attached, form an unsubstituted 3-(2-oxo)-indolenylidenyl radical, and $R_3$ and $R_4$ are the same and each is the residue of sulphuric or phosphoric acid, and non-toxic salts thereof.

2. 3,3-Bis-(p-phosphonoxy-phenyl)-2-indolinone.

3. Tetrasodium salt of 3,3-bis-(p-phosphonoxyphenyl)-2-indolinone.

4. 3,3-Bis-(p-sulphoxyphenyl)-2-indolinone.

5. Disodium salt of 3,3-bis-(p-sulphoxyphenyl)-2-indolinone.

* * * * *